US010388199B2

(12) United States Patent
Tiberi et al.

(10) Patent No.: US 10,388,199 B2
(45) Date of Patent: Aug. 20, 2019

(54) ILLUMINATION PERCEPTION AUGMENTATION METHOD, COMPUTER PROGRAM PRODUCTS, HEAD-MOUNTABLE COMPUTING DEVICE AND LIGHTING SYSTEM THAT ADJUSTS A LIGHT OUTPUT OF A LIGHT SOURCE BASED ON A DESIRED LIGHT CONDITION

(71) Applicant: SIGNIFY HOLDING B.V., Eindhoven (NL)

(72) Inventors: Luca Tiberi, Eindhoven (NL); Ashish Vijay Pandharipande, Eindhoven (NL); Paul Anthony Shrubsole, Arnhem (NL); Ralf Gertruda Hubertus Voncken, Eindhoven (NL); Maurice Herman Johan Draaijer, Ittervoort (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 11 days.

(21) Appl. No.: 15/521,485

(22) PCT Filed: Oct. 22, 2015

(86) PCT No.: PCT/EP2015/074464
§ 371 (c)(1),
(2) Date: Apr. 24, 2017

(87) PCT Pub. No.: WO2016/062800
PCT Pub. Date: Apr. 28, 2016

(65) Prior Publication Data
US 2017/0337857 A1    Nov. 23, 2017

(30) Foreign Application Priority Data

Oct. 23, 2014 (EP) .................................... 14189992

(51) Int. Cl.
*G09G 5/00* (2006.01)
*G09G 3/00* (2006.01)
(Continued)

(52) U.S. Cl.
CPC ............ *G09G 3/003* (2013.01); *G02B 27/017* (2013.01); *G02C 7/101* (2013.01); *G06F 3/011* (2013.01);
(Continued)

(58) Field of Classification Search
None
See application file for complete search history.

(56) References Cited

U.S. PATENT DOCUMENTS

5,671,035 A   9/1997   Barnes
6,037,914 A   3/2000   Robinson
(Continued)

*Primary Examiner* — Lunyi Lao
*Assistant Examiner* — Kirk W Hermann
(74) *Attorney, Agent, or Firm* — Meenakshy Chakravorty (57) ABSTRACT

A method of augmenting an illumination perception by one or more wearers of respective head-mountable computing devices each including at least one transparent display module is disclosed. The method comprises determining a desired light condition for said wearer in a space, determining an actual light condition for said wearer in said space; and displaying a semi-transparent image on the at least one transparent display module to filter the light passing through the at least one display module in case the actual light condition differs from the desired light condition. In embodiments, the user preferences may be used to perform a global optimization of the light output by one or more (distributed) light sources of a lighting system. Computer program products comprising computer program code for implementing such a method when executed on a suitable processor, a head-mountable computing device and a lighting system are also disclosed.

9 Claims, 6 Drawing Sheets

(51) Int. Cl.
  *G02C 7/10* (2006.01)
  *G06F 3/01* (2006.01)
  *G02B 27/01* (2006.01)
  *G06F 3/023* (2006.01)
  *G06F 3/0488* (2013.01)
  *H05B 37/02* (2006.01)

(52) U.S. Cl.
  CPC ............ *G06F 3/016* (2013.01); *G06F 3/0238* (2013.01); *G06F 3/04883* (2013.01); *G06F 3/04886* (2013.01); *G02B 2027/0178* (2013.01); *H05B 37/0272* (2013.01)

(56) References Cited

U.S. PATENT DOCUMENTS

| | | | |
|---|---|---|---|
| 7,874,666 B2 | 1/2011 | Xu et al. | |
| 9,576,398 B1 * | 2/2017 | Zehner | G06T 19/006 |
| 2002/0057280 A1 | 5/2002 | Anabuki et al. | |
| 2011/0043881 A1 | 2/2011 | Elferich | |
| 2011/0279355 A1 | 11/2011 | Yasue et al. | |
| 2012/0206443 A1 | 8/2012 | Kimura et al. | |
| 2012/0326948 A1 | 12/2012 | Crocco et al. | |
| 2013/0057573 A1 * | 3/2013 | Chakravarthula | G06F 3/005 345/619 |
| 2013/0114043 A1 * | 5/2013 | Balan | G02B 27/017 351/210 |
| 2013/0242262 A1 | 9/2013 | Lewis | |
| 2013/0342564 A1 * | 12/2013 | Kinnebrew | G09G 3/003 345/619 |
| 2014/0240226 A1 | 8/2014 | Faenger | |
| 2014/0340286 A1 * | 11/2014 | Machida | G02B 26/0833 345/8 |

* cited by examiner

ILLUMINATION PERCEPTION AUGMENTATION METHOD, COMPUTER PROGRAM PRODUCTS, HEAD-MOUNTABLE COMPUTING DEVICE AND LIGHTING SYSTEM THAT ADJUSTS A LIGHT OUTPUT OF A LIGHT SOURCE BASED ON A DESIRED LIGHT CONDITION

CROSS-REFERENCE TO PRIOR APPLICATIONS

This application is the U.S. National Phase application under 35 U.S.C. § 371 of International Application No. PCT/EP2015/074464, filed on Oct. 22, 2015, which claims the benefit of European Patent Application No. 14189992.2, filed on Oct. 23, 2014. These applications are hereby incorporated by reference herein.

FIELD OF THE INVENTION

The present invention relates to a method of augmenting an illumination perception for a person.

The present invention further relates to computer program products for executing such a method on a suitable processor.

The present invention yet further relates to a head-mountable computing device including such a computer program product.

The present invention still further relates to a lighting system including such a computer program product.

BACKGROUND OF THE INVENTION

Lighting systems exists that comprise a plurality of light sources, e.g. luminaires, that are distributed across a certain space and that are controlled to achieve a desirable illumination level within such a space.

However, if such a space is occupied by a plurality of users, it may be difficult to achieve an illumination condition that is mutually agreeable to each of these users, as different users may have different personal preferences or maybe engaged in different tasks that require different optimal illumination conditions. This may be addressed by configuring the lighting system such that different regions of the space have different local lighting conditions in order to provide optimized illumination conditions in each of these different regions. Unfortunately, such approaches are seldom satisfactory as it is often impossible to generate truly localized illumination conditions with such a lighting system due to the fact that the light from different light sources cannot be locally contained; in other words, light from different light sources tends to spread over large areas within the space such that it becomes extremely difficult to create the desired localized illumination conditions.

U.S. Pat. No. 5,671,035 discloses a head-mountable device for selectively reducing the intensity of light in the field of view of an eye of its wearer. The device has a frame, a power source, a light sensor, two light transmissive lenses having an array of shutter elements, user controls and processing circuitry. The user controls are utilized to set user constants to customise the apparatus and may be used to select a mode of operation. During operation, the light sensor scans the field of view and produces light intensity signals. These light intensity signals are processed with the user constants and preset threshold values. If the light intensity signals exceed any of threshold values, then one or more elements of the shutter matrices of each lens is darkened. Such a device is however not ideally suited for adjusting lighting conditions to suit personal preferences in a space illuminated by a lighting system as simply controlling light intensity levels that pass through the device may not be sufficient to achieve the desired illumination characteristics. Moreover, this device cannot address any issues with lighting levels produced by a lighting system.

SUMMARY OF THE INVENTION

The present invention seeks to provide a more flexible method of augmenting an illumination perception.

The present invention further seeks to provide a computer program product for implementing such a method.

The present invention yet further seeks to provide a head-mountable computing device configured to execute such a computer program product.

The present invention still further seeks to provide a lighting system for communicating with such a head-mountable computing device and configured to execute such a computer program product.

According to an aspect, there is provided a method of augmenting an illumination perception by a wearer of a head-mountable computing device adapted to communicate with a lighting system, the head-mountable computing device including at least one transparent display module for covering a field of view of said wearer, the method comprising determining a desired light condition for said wearer in a space; determining an actual light condition for said wearer in said space; displaying a semi-transparent image on the at least one transparent display module to filter the light passing through the at least one display module in case the actual light condition differs from the desired light condition, communicating the desired lighting condition and actual lighting condition to a lighting system including a plurality of light sources for illuminating said space; and adjusting a light output of at least some of the light sources in response to said communication.

Such a method benefits from increased control over the filtering of light passing through the at least one display module due to the fact that in addition to for instance light intensity, light colour and the like may also be controlled. In addition, the use of a display for the generation of such a filter instead of dedicated valve elements ensures that the head-mountable computing device may be used for purposes other than illumination control, which may make it more attractive to use. Moreover, although as previously explained the adjustment of such a lighting system may not always lead to optimal localized light conditions, such adjustments may however be used to reduce a deviation from such optimal localized light conditions, thereby achieving improved performance of the lighting system, for instance in terms of energy consumption.

The semi-transparent image may be a homogeneous image or may comprise different filter properties in different regions of the image so as to block different amounts of light passing through the at least one display module.

For instance, light levels in the periphery of the view of the wearer of the head-mountable computing device may be reduced compared to light levels central to the view of the wearer, which may provide the wearer with an improved viewing experience, for instance when watching the screen of an electronic device or when reading.

The head-mountable computing device may comprise an image sensor, wherein the step of determining said actual light condition may be performed with said image sensor. This has the advantage that illumination levels close to the eyes of the wearer of the head-mountable computing device may be determined without requiring a dedicated light sensor.

In a particularly advantageous embodiment, determining said desired light condition comprises determining a task performed by said wearer by capturing a further image indicative of said task; recognizing said task from said further image; and retrieving a defined desired light condition for said task. The determination of such a task may for instance be achieved with the assistance of the aforementioned image sensor. This has the advantage that the light condition to which the wearer of the head-mountable computing device is exposed may be adjusted based on the task in which the wearer is engaged, such that when the wearer switches tasks, the appropriate light condition may be automatically adjusted without requiring user input. To this end, the semi-transparent image may be based on said defined desired light condition for said task.

Where such communication with a lighting system is achieved, the method may further comprise calculating the semi-transparent image with the lighting system and communicating the semi-transparent image from the lighting system to the head-mountable computing device in order to reduce the computational effort required by the head-mountable computing device. This for instance may improve the battery lifetime of such a device.

The adjusting step may comprise adjusting said light sources in response to a plurality of said desired lighting conditions and a plurality of associated actual lighting conditions communicated to the lighting system by a plurality of head-mountable computing devices within said space. In this embodiment, the method may further comprise determining the respective positions of the wearers of the head-mountable computing devices within said space, wherein said adjusting step comprises adjusting the light output of said light sources in response to said plurality of desired lighting conditions, said plurality of actual lighting conditions and the respective positions of said wearers in said space in order to improve localized illumination conditions.

In a particularly advantageous embodiment, the method further comprises calculating a minimum required light condition for said space based on said received desired light conditions, said minimum required light condition ensuring that the actual light condition in each respective position enables the desired light condition for its wearer; adjusting the light output of at least some of said light sources in order to achieve the minimum required light condition for said space. This step may further comprise receiving, at the lighting system, a communication including updated actual lighting conditions resulting from the minimum required light condition; calculating, for each received updated actual lighting condition, a deviation from its associated desired light condition; wherein the step of calculating the semi-transparent image comprises calculating the semi-transparent image for each head-mountable computing device within said space based on said deviation. In this embodiment, the aggregate deviation between actual light conditions and desired light conditions may be minimized, thereby achieving a light system in which light output is controlled as a function of aggregate user requirements, which for instance may assist in reducing the energy consumption of such a lighting system.

According to another aspect, there is provided a computer program product comprising computer program code for, when executed on a processor of a head-mountable computing device, implementing the method according to one or more of the aforementioned embodiments. Such a computer program product facilitates the display of semi-transparent images on the head-mountable computing device in order to achieve the desired light conditions for its wearer and adjustment of the lighting levels of the lighting system in accordance with the difference between actual and desired lighting conditions as detected by the head-mountable computing device and communicated to the lighting system.

According to yet another aspect, there is provided a head-mountable computing device for augmenting an illumination perception by its wearer, the head-mountable computing device comprising at least one transparent display module, a processor for controlling the at least one transparent display module and at least one of an image sensor and a light sensor, wherein the processor is adapted to determine a desired light condition for said wearer in a space (10); determine an actual light condition for said wearer in said space; display a semi-transparent image on the at least one transparent display module to filter the light passing through the at least one display module in case the actual light condition differs from the desired light condition; and communicate the desired lighting condition and actual lighting condition to a lighting system including a plurality of light sources for illuminating said space
in order to provide its wearer with desired light conditions and facilitate adjustment of the lighting levels produced by the lighting system.

According to yet another aspect, there is provided a lighting system comprising a plurality of light sources arranged in a network further comprising a system processor for calculating respective settings for said light sources in order to adjust a light output of at least some of the light sources in response to the desired light condition and actual light condition communicated to the lighting system by the aforementioned head-mountable computing device, wherein the system processor is adapted to receive a communication including the desired lighting condition and actual lighting condition as determined by the head-mountable computing device; and calculate respective settings for said light sources in order to adjust a light output of at least some of the light sources in response to a difference between the determined actual light condition and the determined desired light condition communicated to the lighting system in order to improve the control of such a lighting system by taking into account the one or more desired light conditions and actual light conditions as provided by the one or more head-mountable computing devices within the space illuminated by the lighting system.

The lighting system may further comprise at least one such an aforementioned head-mountable computing device, thereby providing a lighting system that is particularly suited to provide multiple users in a space illuminated by the lighting system with personalized light conditions.

The lighting system including such a head-mountable computing device may further comprise the aforementioned computer program product, wherein the processor and the system processor are adapted to execute the computer program code of the computer program product, that is, the processor is adapted to execute the computer program code for the method steps to be performed on the head-mountable computing device and the system processor is adapted to execute the method steps to be performed on the lighting system.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

It should be understood that the Figures are merely schematic and are not drawn to scale. It should also be understood that the same reference numerals are used throughout the Figures to indicate the same or similar parts.

In the context of the present application, a head-mountable computing device is a device that can be worn of the head of its user and provides the user with computing functionality. The head-mountable computing device may be configured to perform specific computing tasks as specified in a software application (app) that may be retrieved from the Internet or another computer-readable medium. Non-limiting examples of such head-mountable computing devices include smart headgear, e.g. eyeglasses, goggles, a helmet, a hat, a visor, a headband, or any other device that can be supported on or from the wearer's head, and so on.

In the context of the present application, a light condition is a characteristic of light, such as its colour, colour temperature, intensity and combinations of such characteristics. A desired light condition is a light condition that is defined by a user such as a wearer of the head-mountable computing device that defines a light condition that the user wants to experience. This may be a light condition independent of a task performed by the user or a light condition specific to a task performed by the user, such as reading, writing, watching a computer screen or a screen of another electronic device, and so on, as such tasks typically have different optimal light conditions.

A desired light condition may be an illumination level, i.e. light intensity, a desired light temperature, e.g. warm light, cool light, a desired light colour, and so on, as well as combinations of such light characteristics. The desired light condition may be defined by the user in any suitable manner, for instance by capturing an actual light condition as a desired light condition, by adjusting a semi-transparent image displayed on the at least one display module of the head-mountable computing device, and so on. Alternatively, the desired light condition may be a (user-independent) defined light condition that is defined as being optimal for a particular task. Other suitable embodiments of a desired light condition will be apparent to the skilled person.

In the context of the present application, a semi-transparent image is an image to be displayed on a display module of a head-mountable computing device for the purpose of adjusting, i.e. filtering, light passing through the display module in order to adjust the light condition perceived by the wearer of the head-mountable computing device. The semi-transparent image may be a greyscale image for instance when adjusting a light intensity, or a coloured image for instance when adjusting a light colour characteristic alternative or additional to adjusting a light intensity.

The semi-transparent image may be a uniform or homogeneous image such that the illumination perception of the wearer is adjusted in the same manner throughout the entire field of view of the wearer, or may be a non-uniform image, e.g. a graded image that comprises different filter properties in different regions of the image so as to block different amounts of light passing through the at least one display module and adjust the illumination perception of the wearer by different amounts in different parts of the field of view of the wearer. For instance, the semi-transparent image may be chosen such that the peripheral view of the wearer is adjusted in a different manner than the central portion of the view of the wearer; for example, light passing through parts of the display module that are observed in the peripheral regions of the view of the wearer may be more strongly filtered than light passing through the parts of the display module that are observed in the central regions of the view of the wearer, such that the wearer may more easily focus on the task at hand.

Figure 1:
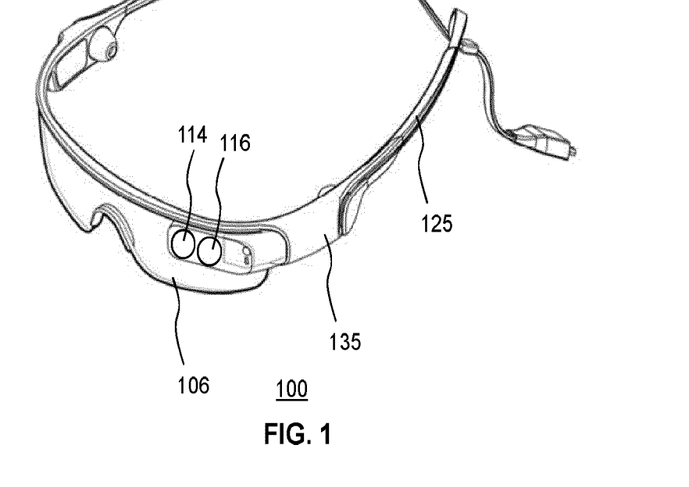
FIG. 1 schematically depicts a head-mountable computing device according to an embodiment.
Figure 2:
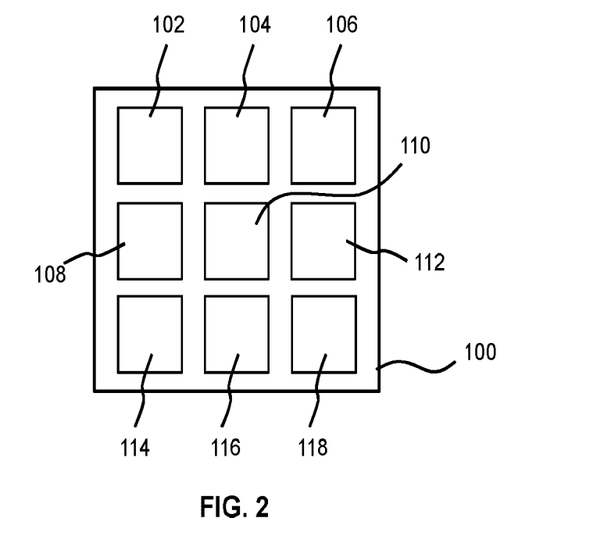
FIG. 2 schematically depicts a functional block-based representation of a head-mountable computing device according to an embodiment.

FIG. 1 schematically depicts a head-mountable computing device 100 according to an embodiment. By way of non-limiting example, the head mountable computing device 100 is depicted as smart glasses, but it should be understood that the head-mountable computing device 100 may take any suitable shape as previously explained. The head-mountable computing device 100 typically comprises at least one transparent or see-through display module 106, under control of a discrete display controller (not shown). Alternatively, the display controller may be implemented by a processor 110 of the head-mountable computing device 100, as shown in FIG. 2.

The at least one display module 106 is typically arranged to cover the field of view of the wearer when the head-mountable computing device 100 is worn by the wearer such that a wearer of the head-mountable computing device 100 may observe the field of view through an image displayed on the at least one the display module 106. In an embodiment, the head-mountable computing device 100 comprises a pair of transparent display modules 106 including a first display module that can be observed by the right eye of the wearer and a second display module that can be observed by the left eye of the wearer. Alternatively, the at least one display module 106 may be a single display module covering both eyes of the wearer.

The at least one display module 106 may be provided in any suitable form, such as a transparent lens portion as shown in FIG. 1. Alternatively, the head-mountable computing device 100 may comprise a pair of such a lens portions, i.e. one for each eye as explained above. The one or more transparent lens portions are dimensioned such that substantially the entire field of view of the wearer is obtained through the one or more transparent lens portions. For instance, the at least one display module 106 may be shaped as a lens to be mounted in the frame 125 or component housing 135 of the head-mountable computing device 100.

It will be understood that the frame 125 may have any suitable shape and may be made of any suitable material, e.g. a metal, metal alloy, plastics material or combination thereof. Several components of the head-mountable computing device 100 may be mounted in the frame 125, such as in a component housing 135 forming part of the frame 125. The component housing 135 may have any suitable shape, preferably an ergonomic shape that allows the head-mountable device 100 to be worn by its wearer in a comfortable manner.

The head-mountable computing device 100 may further comprise an image sensor 114 for capturing an image of the field of view of the wearer and a light sensor 116 for determining an actual light condition near the eye of its wearer, the purpose of which will be explained in more detail later. In an alternative embodiment, the light sensor 116 may be omitted and the image sensor 114 may be configured to also determine the actual light condition near the eye of the wearer of the head-mountable computing device 100. In yet another embodiment, the image sensor 114 may be omitted. Any suitable image sensor 114 and/or light sensor 116 may be integrated in the head-mountable computing device 100 for this purpose. The image sensor 114 and/or light sensor 116 preferably are located in close vicinity of an eye of the wearer of the head-mountable computing device 100, such that an actual light condition may be determined by the image sensor 114 or the light sensor 116 that accurately corresponds to the light condition observed by the wearer. As will be explained in more detail later, such accurate localized actual light conditions may also be advantageously used by a lighting system to improve or optimize the light conditions in a space housing the lighting system.

In accordance with at least some embodiments of the present invention, the head-mountable computing device 100 is configured to display a semi-transparent image on the at least one display module 106 to augment the light perception of the wearer in his field of view, that is, to adjust or filter a light condition observed by the wearer of the head-mountable computing device 100 through the at least one display module 106. In particular, the head-mountable computing device 100 is typically configured to determine an actual light condition, for instance with the image sensor 114 or the light sensor 116, which actual light condition is compared against a desired light condition to determine if the actual light condition deviates from the desired light condition. In case of such a deviation, a semi-transparent image is obtained, e.g. generated by the processor 110 or retrieved from a storage device including a set of semi-transparent images, and displayed on the at least one display module 106. The semi-transparent image augments or filters the light passing through the at least one display module 106 such that the actual light condition is converted into the desired light condition by the same-transparent image displayed on the at least one display module 106. Consequently, the wearer of the head-mountable computing device 100 may perceive a light condition in a space in which the wearer is located as a desired light condition despite the fact that the actual light condition in the space deviates from the desired light condition.

FIG. 2 schematically depicts a block diagram of an embodiment of the head-head-mountable computing device 100, further highlighting the functionality of the head-mountable computing device 100 in terms of functional blocks, at least some of which may be optional functionality, as will be explained in more detail below.

The functioning of at least part of the head-mountable computing device 100 may be controlled by a processor 110 that executes instructions, i.e. computer program code, stored in a non-transitory computer readable medium, such as data storage 112. Thus, processor 110 in combination with processor-readable instructions stored in data storage 112 may function as a controller of the head-mountable computing device 100. In addition to instructions that may be executed by processor 110, data storage 112 may store data that is associated with the generation of semi-transparent images on the at least one display module 106.

Figure 5:
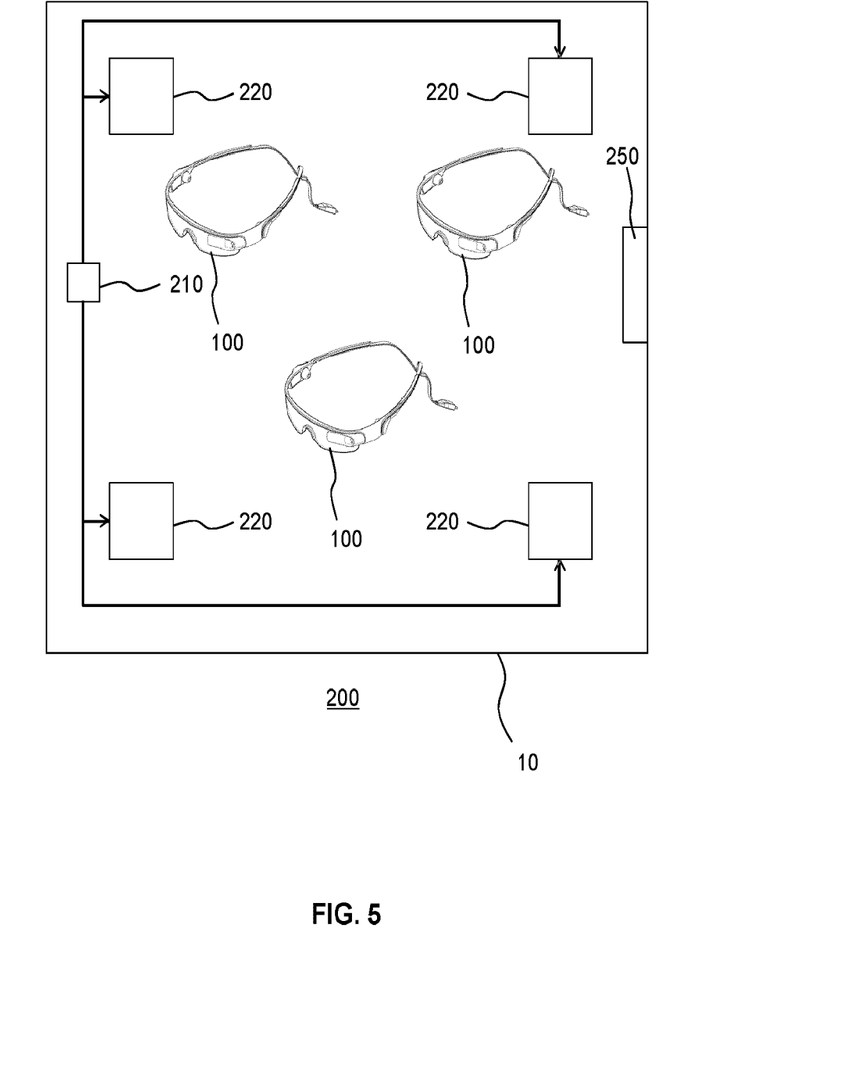
FIG. 5 schematically depicts a lighting system including one or more head-mountable computing devices according to an embodiment.

The head-mountable computing device 100 is adapted to wirelessly communicate with a remote system, e.g. a lighting system 200 as shown in FIG. 5, as will be explained in more detail below. To this end, the head-mountable computing device 100 may include a wireless communication interface 102 for wirelessly communicating with a remote target such as the remote lighting system 200. Any suitable wireless communication protocol may be used for any of the wireless communication between the head-mountable computing device 100 and the remote system 200, e.g., an infrared link, Zigbee, Bluetooth, a wireless local area network protocol such as in accordance with the IEEE 802.11 standards, a 2G, 3G or 4G telecommunication protocol, and so on. The remote lighting system 200 may for instance be controlled to adjust a light condition in a space 10 housing the lighting system 200, as will be further explained below.

The head-mountable computing device 100 may optionally comprise a further wireless communication interface 104 for wirelessly communicating with a further remote system, e.g. a wireless LAN, through which the head-mountable computing device 100 may access a remote data source such as the Internet, for instance to store data such as user preferences and/or one or more semi-transparent images to be displayed on the at least one display module 106. Alternatively, the head-mountable computing device 100 may include one wireless communication interface that is able to communicate with the remote system 200 and a further remote target such as the further network. The processor 110 may further be adapted to control wireless communication interface 102 and, if present, wireless communication interface 104.

In an embodiment, the head-mountable computing device 100 may be arranged to detect a user instruction and to trigger an operation in response to the detected user instruction, e.g. using at least one further sensor 118 including a motion sensor like a gyroscope or similar in case the user instruction is a head motion, or by using the image sensor 114 or a camera to capture an image of a gesture-based instruction made by the wearer. Other suitable sensors for such gesture or motion capturing will be apparent to the skilled person. The processor 110 may be arranged to recognize a gesture or motion made by its wearer from the captured sensor data and to interpret the recognized gesture or motion as an instruction, for instance to identify a task performed by the wearer of the head-mountable computing device 100, e.g., reading, computing, and so on. Non-limiting examples of such a motion for instance include a turn or nod of the wearer's head. Non-limiting examples of such a gesture for instance include a hand or finger gesture in the field of view through the head-mountable computing device 100, which may be detected in an image captured with the image sensor 114.

Alternatively or additionally, the at least one further sensor 118 may include a sound sensor, e.g. a microphone, may be present to detect a spoken instruction, wherein the processor 110 may be communicatively coupled to the further sensor in order to process the sensor data and detect the spoken instruction.

The at least one further sensor 118 may additionally or alternatively include an input sensor, e.g. a button or the like for facilitating the wearer of the head-mountable computing device 100 to select the user instruction from a list of options. Such list of options for instance may be displayed on the at least one transparent display module 106 of the head-mountable computing device 100.

The head-mountable computing device 100 may further include a user interface 108 for receiving input from the user. User interface 108 may include, for example, a touchpad, a keypad, buttons, a microphone, and/or other input devices. The processor 110 may control at least some of the functioning of head-mountable computing device 100 based on input received through user interface 108. In some embodiments, the at least one further sensor 118 may define or form part of the user interface 108.

Although FIG. 2 shows various components of head-mountable computing device 100, i.e., wireless communication interfaces 102 and 104, processor 110, data storage 112, image sensor 114, light sensor 116 and the one or more further sensors 118, as being separate from the at least one display module 106, one or more of these components may be mounted on or integrated into the at least one display module 106. For example, an image capturing sensor may be mounted on a see-through display module 106, user interface 108 could be provided as a touchpad on a see-through display module 106, processor 110 and data storage 112 may make up a computing system in a see-through display module 106, and the other components of head-mountable computing device 100 could be similarly integrated into a see-through display module 106.

Alternatively, the head-mountable computing device 100 may be provided in the form of separate devices that can be worn on any part of the body or carried by the wearer, apart from at least the one display module 106, which typically will be mounted on the head. The separate devices that make up head-mountable computing device 100 may be communicatively coupled together in either a wired or wireless fashion.

Figure 3:
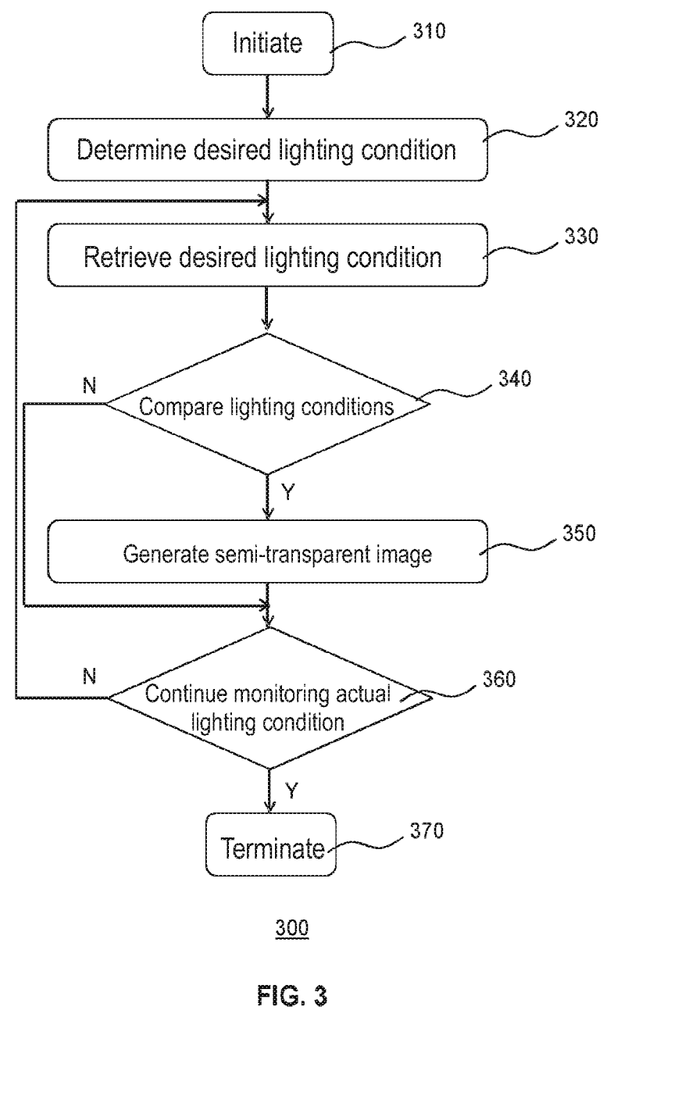
FIG. 3 is a flow chart of a method of operating such a head-mountable computing device according to an embodiment.

An embodiment of the operation of the head-mountable computing device 100 will now be explained in more detail with the aid of FIG. 3, which depicts a flow chart of a method 300, the steps of which may be performed by executing corresponding computer program code on the processor 110 of the head-mountable computing device 100. In step 310, the method starts, for instance by initializing the head-mountable computing device 100. The method then proceeds to step 320 in which a desired light condition is determined for a wearer of the head-mountable computing device 100. The desired light condition may be defined by the wearer in any suitable manner, for instance by using a user interface of the head-mountable computing device 100, such as the user interface 108 to define the desired light condition, by using gestures or head movements to define the desired light conditions, which gestures or movements may be detected by a sensor such as a gyroscope in the head-mountable computing device 100, and so on. Alternatively, the user interface may be a separate device such as a tablet, smart phone or the like, which is communicatively coupled to the head-mountable computing device 100, e.g. in a wired or wireless fashion.

The defined desired light condition may be stored in a suitable location such as data storage 112 for retrieval in subsequent configurations of the head-mountable computing device 100. In such subsequent configurations, step 320 may simply comprise retrieving a previously defined desired light condition from the suitable location. The user may define the desired light condition in terms of brightness, light colour, colour temperature, and so on.

In an embodiment, the wearer may define the desired lighting condition by adjusting a semi-transparent image displayed on the at least one display module 106, e.g. by adjusting the transparency and/or colour of the displayed semi-transparent image in order to define the desired lighting condition. The defined desired light condition may be associated with an actual light condition during which the desired light condition is defined, such that for a different actual light condition the desired light condition may be reproduced from the relationship between the defined desired light condition and the actual light condition under which the desired light condition was defined. In other words, because the original actual light condition under which the desired light condition was defined is known, a change in the actual light condition may be used to recalibrate the semi-transparent image such that the illumination perception of the wearer of the head-mountable computing device 100 is unaffected by such a change in the actual light condition.

Alternatively, the user may define the desired lighting condition in terms of illumination parameters, e.g. by selecting appropriate parameters using a suitable user interface. This for instance may be the user interface 108 of the head-mountable computing device 100 or may be a separate user interface, e.g. a tablet device, smart phone or the like, which is communicatively coupled to the head-mountable computing device 100, e.g. in a wired or wireless fashion. The processor 110 may compute the semi-transparent image from the thus specified light parameters. In an embodiment, the processor 110 may determine that the desired light condition cannot be achieved by augmenting the actual light condition. In this scenario, the processor 110 may approximate the desired light condition by generating a semi-transparent image for which the difference between the light condition perceived by the wearer of the semi-transparent image and the desired light condition is minimized, e.g. using suitable optimization algorithms.

Once the desired light condition has been defined, the wearer may trigger the storage of the thus generated semi-transparent image, e.g. in data storage 112, using the appropriate command to invoke this storage.

Figure 4:
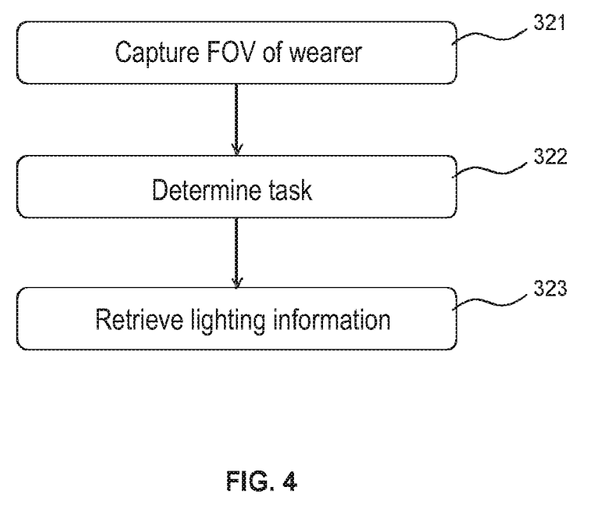
FIG. 4 is a flow chart of a step of the method of FIG. 3 according to an embodiment.

FIG. 4 depicts a flowchart of a particular embodiment of step 320, in which the desired light condition is determined based on the recognition of the task performed by the wearer of the head-mountable computing device 100. In this embodiment, step 320 contains a first sub step 321 in which an image of the field of view of the wearer is captured with the image sensor 114, which image is analyzed by the processor 110 in order to recognize an object in the image that is indicative of a particular task being performed by the wearer in order to determine a task that is being performed by the wearer in second sub step 322. For instance, the image may contain a book, which may be indicative of the wearer performing a reading task, the image may contain a TV screen, which may be indicative of the wearer watching TV, the image may contain a computer screen, which may be indicative of the wearer working on a computer, and so on.

Once the task has been determined, a third sub step 323 is performed in which a desired light condition for the determined task is retrieved or otherwise defined as previously explained. This embodiment benefits from the fact that different tasks may have different desired light conditions; for instance, a relatively bright illumination may be desirable when reading, whereas a relatively dim illumination may be desirable when watching TV. Consequently, this embodiment further enhances the illumination perception by the wearer of the head-mountable computing device 100 as different personalized illumination perceptions may be made available under different circumstances.

Now upon returning to FIG. 3, the method proceeds to step 330 in which an actual light condition as observed by the wearer of the head-mountable computing device 100 is determined using the image sensor 114 or the light sensor 116 as previously explained. In step 340, a comparison is made between the actual light condition determined in step 330 and the desired light condition determined in step 320. If it is determined that the actual light condition matches the desired light condition, there is no need to adjust the perceived light condition by the wearer of the head-mountable computing device 100 and the method may proceed to step 316, which will be explained in more detail later.

However, if it is determined that the actual light condition deviates from the desired light condition such that the perception of the actual light condition by the wearer of the head-mountable computing device 100 may be augmented by displaying a semi-transparent image on the at least one display module 106 in order to transform the perception of the wearer from the actual light condition into the desired light condition, the method proceeds to step 350 in which the appropriate semi-transparent image is generated and displayed on the at least one display module 106. In the context of the present application, the generation of the semi-transparent image may simply comprise the retrieval of the semi-transparent image from a suitable location such as data storage 112 may alternatively comprise the calculation of the semi-transparent image, for instance by processor 110. As previously explained, in an embodiment this calculation may comprise determining a difference between a previous light condition under which a semi-transparent image was generated and the actual light condition to recalibrate the previously generated semi-transparent image.

In an embodiment, it may be checked in step 360 if the head-mountable computing device 100 should continue monitoring the actual light condition in order to detect changes in the actual light condition, for instance because the light system is adjusted such that the luminous output produced by the light system is altered, and/or because natural light conditions in a space in which the wearer of the head-mountable computing device 100 is present have changed. In such a scenario, it may be desirable to continuously or at least periodically monitor the actual light condition such that the semi-transparent image may be adjusted as previously explained to ensure that changes in the actual light condition do not lead to a change in the perceived light condition by the wearer of the head-mountable computing device 100. If such continued monitoring is desirable, the method may revert back to step 330. Otherwise, if such continued monitoring is no longer desirable or is not desirable at all, the method may terminate in step 370.

The desired and actual light conditions as determined by the head-mountable computing device 100 may be used in a lighting system to adjust the luminous output produced by such a lighting system.

FIG. 5 schematically depicts a space 10 in which a lighting system 200 as well as a number of head-mountable computing devices 100 is present. The lighting system 200 may be a networked lighting system that comprises a communications controller 210 communicatively coupled to a number of light sources 220 distributed across the space 10, which communications controller 210 is adapted to wirelessly communicate with the head-mountable computing devices 100 as well as to communicate with the one or more light sources 220. The communications between the communications controller 210 and the one or more light sources 220 may be achieved in any suitable manner, e.g. wired communications, wireless communications or mixtures thereof.

The communications controller 210 may be adapted to send control information to the light sources 220 for adjusting the light output of these light sources. In an embodiment, the communications controller 210 centrally controls at least some of the light sources 220. Alternatively or additionally, at least some of the light sources 220 may have local controllers that are configured to receive the control information from the communications controller 210 and to translate this control information into control signals for their associated light source 220.

In an embodiment, the space 10 may further comprise an optional indoor positioning system 250, which may be configured to determine the positions of the one or more head-mountable computing devices 100 within the space 10. Such indoor positioning systems are well-known per se and will therefore not be further explained for the sake of brevity only. It should be understood that any suitable indoor positioning system 250 may be used. The indoor positioning system 250 is typically configured to communicate with the communications controller 210 of the lighting system 200 to provide the lighting system 200 with the positions of the active head-mountable computing devices 100 within the space 10. As will be explained in more detail below, this position information may be used by the lighting system 200 to adjust the settings of individual light sources 220 as a function of a desired light condition in a particular location, which desired light condition has been communicated to the lighting system 200 by the head-mountable computing device 100 in this location.

The lighting system 200 may associate individual head-mountable computing devices 100 with the determined locations in any suitable manner; for instance, the indoor positioning system 250 may provide the lighting system 200 with position information that includes identification information for the respective head-mountable computing devices 100 within the space 10, e.g. identification information communicated by the head-mountable computing devices 100, which identification information may also be incorporated by the head-mountable computing devices 100 in their respective communications with the lighting controller 210 such that the lighting controller 210 can associate each head-mountable computing device 100 with a position determined by the indoor positioning system 250.

Figure 6:
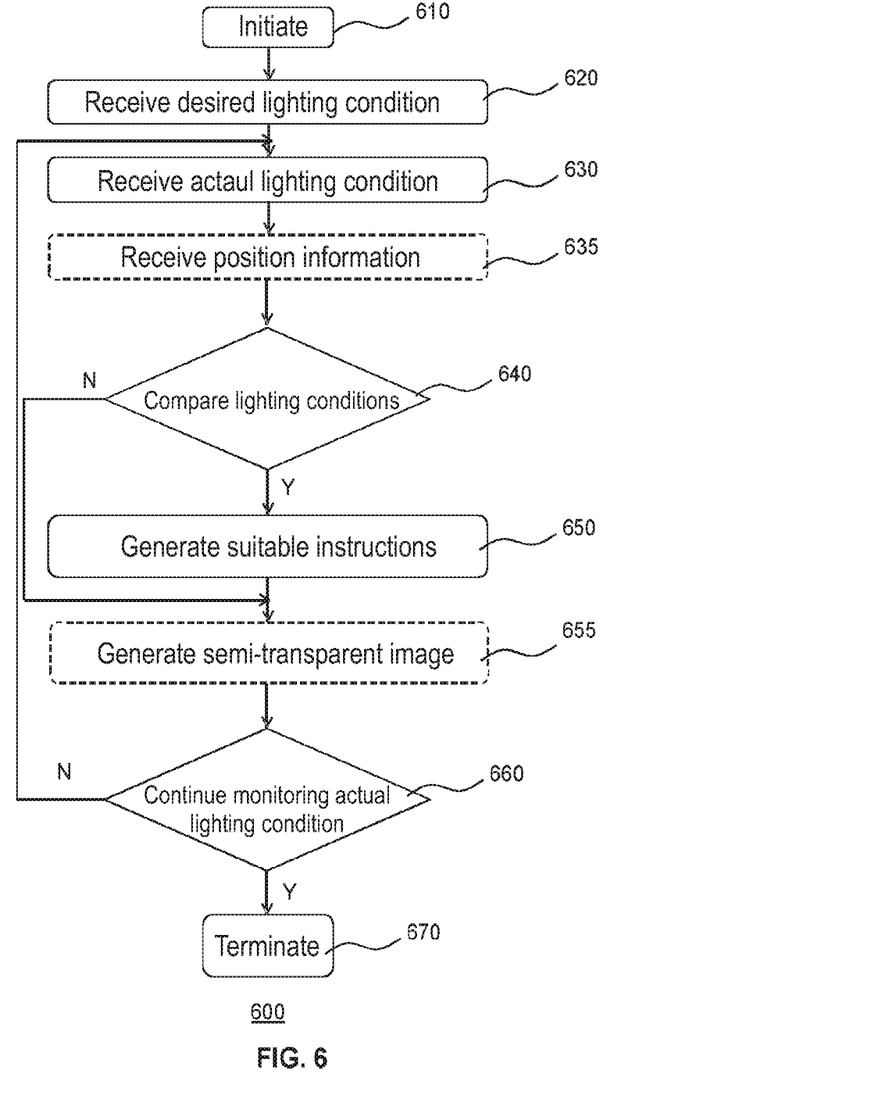
FIG. 6 depicts a flow chart of a method of operating such a lighting system according to an embodiment.

The interaction between the lighting system 200 and the one or more head-mountable computing devices 100 in use within the space 10 will now be explained in more detail with the aid of FIG. 6, which depicts a flowchart of a method 600 according to another embodiment, which method is typically executed on the lighting system 200, e.g. by the communications controller 210, which communications controller 210 for instance may include a processor (not shown) for executing computer program code implementing at least some of the steps of the method 600. Alternatively or additionally, some of the steps of the method 600 may be executed by respective controllers of the one or more light sources 220 of the lighting system 200, as will become apparent from the following description.

The method 600 starts in step 610 in which the lighting system 200 is initialized, for instance by switching on the lighting system 200. The lighting system 200 subsequently engages in a communication with the one or more head-mountable computing devices 100 in the space 10, in which the lighting system 200, e.g. the communications controller 210, receives the desired light conditions in step 620 and receive the actual light conditions in step 630 as determined by the one or more head-mountable computing devices 100 as previously explained. It should be understood that steps 620 and 630 may be executed in any order; moreover, although steps 620 and 630 are shown as separate steps, it should be understood that steps 620 and 630 may be combined into a single step.

In optional step 635, the lighting system 200, e.g. the communications controller 210, may further receive position information for the one or more head-mountable computing devices 100 with which the lighting system 200 has communicated in steps 620 and 630 from the indoor positioning system 250 when present.

In step 640, the lighting system 200 calculates based on the received desired light conditions from the one or more head-mountable computing devices 100 if the light output produced by the one or more light sources 220 may be adapted. For example, in case of the presence of a single head-mountable computing device 100 within the space 10, a processor within the lighting system 200 such as a processor of the communications controller 210, may determine if the actual light condition as determined by the head-mountable computing device 100 deviates from the desired light condition of the wearer of this head-mountable computing device 100. If this is the case, the lighting system 200 may determine if the actual light condition as generated by the one or more light sources 220 may be adjusted such that the deviation of the actual light condition from the desired light condition is reduced or removed altogether.

If this is possible, the lighting system 200 may generate suitable adjustment instructions for the one or more light sources 220 within the lighting system 200 and adjust the one or more light sources 220 in accordance with these adjustment instructions in step 650. This for instance may be used to reduce the energy consumed by the lighting system 200; in particular, if it is determined that actual light conditions in the space 10 are excessive compared to the desired light conditions, the actual light conditions may be adjusted, e.g. reduced, two more closely match the actual light conditions to the desired light conditions. Otherwise, the method may proceed to step 660, which will be explained in more detail below.

In an embodiment in which the lighting system 200 also receives positional information, this positional information may be used to identify specific light sources 220 that are primarily responsible for creating the actual light condition in the location of the head-mountable computing device 100 and to adjust the identified light sources 220 in order to perform a localized adjustment of the light conditions in the space 10. To this end, the lighting system 200 will have awareness of the locations of the light sources 220 within the space 10, i.e. will know the positions of the light sources 220 within the space 10. As it is well-known per se that lighting system 200 may have such spatial awareness, this will not be further explained for the sake of brevity only. It will be understood that the lighting system 200 may implement such spatial awareness in any suitable manner.

The method 600 may further comprise an optional step 655 in which the lighting system 200 generates the semi-transparent image for display on the head-mountable computing device 100 from the actual light condition and desired light condition received from the head-mountable computing device 100, and communicates the generated semi-transparent image to the head-mountable computing device 100. This has the advantage that the head-mountable computing device 100 may require fewer computational resources, which for instance may improve the battery lifetime of the head-mountable computing device 100. It will be understood that the lighting system 200, e.g. a processor within the lighting system 200, may generate the semi-transparent image in essentially the same manner as previously explained for the head-mountable computing device 100.

In step 660, it may be decided if the light system 200 wants to implement a continued monitoring of the actual light conditions determined by the one or more head-mountable computing devices 100 within the space 10. This for instance may be advantageous to check if the adjustments to the luminous output of the one or more light sources 220 have achieved the desired effect and/or to monitor changes in overall lighting conditions caused by external changes, e.g. changes in natural light conditions, changes in conditions of light produced by electronic devices, and so on. If such continued monitoring is desirable, the method may revert back to step 630 such that the luminous output of the lighting system 200 may be continuously or at least periodically adjusted to ensure that the lighting system 200 remains operational in an optimal mode of operation. Otherwise, the method may terminate in step 670.

In an embodiment, the lighting system 200 may receive desired and actual light conditions from a plurality of head-mountable computing devices 100 within the space 10. In this embodiment, the adjustment of the one or more light sources 220 in step 650 may need to be based on a combined analysis of the desired and actual light conditions received from the plurality of head-mountable computing devices 100. This is explained in more detail with the aid of FIG. 7, which is a flow chart of a number of sub steps of step 640, which sub steps may be performed in a scenario where the space 10 is occupied by a plurality of users each wearing a head-mountable computing device 100.

Figure 7:
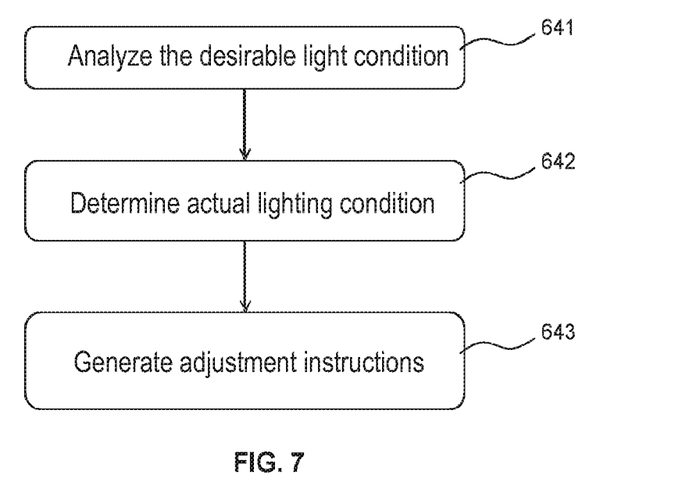
FIG. 7 is a flow chart of a step of the method of FIG. 6 according to an embodiment.

In a first sub step 641, the lighting system 200 may analyze the desirable light conditions received from the plurality of head-mountable computing devices 100 and determine in second sub step 642 the minimal actual light condition at which each desirable light condition can be achieved within the space 10. In an embodiment, the minimal actual light condition may be defined as the configuration of the lighting system 200 for which the aggregate or average deviation between the actual light condition and desired light condition as determined by the respective head-mountable computing devices 100 is minimized.

This configuration may be a global configuration in which the head-mountable computing devices 100 are treated as a single pool of head-mountable computing devices 100 and the respective positions of the head-mountable computing devices 100 are not taken into consideration, for instance because such positional information is not available, such that the third sub step 643 in which the adjustment instructions for the one or more light sources 220 in the lighting system 200 are generated in order to create a global light condition within the space 10 in order to achieve the determined minimal actual light condition.

Alternatively, this configuration may take such positional information into account, such that the minimization of the deviation between actual light condition and the desired light condition as determined by a head-mountable computing device 100 may be implemented at an individual level, e.g. by determining a plurality of minimal actual light conditions, with each minimal actual light condition being linked to a head-mountable computing device 100 in a determined location. In this embodiment, the third sub step 643 may comprise generating adjustment instructions for the one or more light sources 220 based on the plurality of minimal actual light conditions to create localized minimal actual light conditions within the space 10, thereby providing each head-mountable computing device 100 with an individually optimized actual light condition.

It is noted that this does not imply that a desired light condition can be created in each location, which would obviate the need for displaying semi-transparent images on the at least one display modules 106 of the head-mountable computing devices 100. As previously explained, it is practically impossible to contain light generated by a light source 220 to a specific location within the space 10, such that it is practically impossible to create perfectly localized light conditions in each location of the wearers of the head-mountable computing devices 100.

As previously explained, the method 600 may optionally generate appropriate semi-transparent images for each of the head-mountable computing devices 100 in step 655 and may continuously or at least periodically monitor changes in the respective actual light conditions determined by the plurality of head-mountable computing devices 100 such that the minimal actual light condition to be produced by the lighting system 200 may be dynamically adjusted in order to ensure that the lighting system 200 is continuously operated in an optimal operation mode, e.g. an energy-efficient operation mode.

Although in the foregoing the light condition information generated by the head-mountable computing device 100 has been used by the communications controller 210 to adjust light sources of the lighting system 200, it is equally feasible that this information is used by the communications controller 210 or another controller to adjust illumination characteristics of other devices. For instance, when the wearer of a head-mountable computing device 100 is watching a screen of an electronic device, the electronic device may be communicatively coupled to the communications controller 210 or other controller and receive screen illumination configuration instructions therefrom, for instance to adjust brightness levels and/or contrast levels of the screen, for instance to improve the contrast of an image generated on the screen for viewing by the wearer of the head-mountable computing device 100, for instance for the purpose of reducing the difference between the actual light condition and the desired light condition as previously explained.

Aspects of the present invention may be embodied as a head-mountable computing device, lighting system, method or computer program product. Aspects of the present invention may take the form of a computer program product embodied in one or more computer-readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Such a system, apparatus or device may be accessible over any suitable network connection; for instance, the system, apparatus or device may be accessible over a network for retrieval of the computer readable program code over the network. Such a network may for instance be the Internet, a mobile communications network or the like. More specific examples (a non-exhaustive list) of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present application, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out the methods of the present invention by execution on the processor 110 may be written in any combination of one or more programming languages, including an object oriented programming language such as Java, Smalltalk, C++ or the like and conventional procedural programming languages, such as the "C" programming language or similar programming languages. The program code may execute entirely on the processor 110 as a stand-alone software package, e.g. an app, or may be executed partly on the processor 110 and partly on a remote server. In the latter scenario, the remote server may be connected to the head-mountable computing device 100 through any type of network, including a local area network (LAN) or a wide area network (WAN), or the connection may be made to an external computer, e.g. through the Internet using an Internet Service Provider.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions to be executed in whole or in part on the processor 110 of the head-mountable computing device 100, such that the instructions create means for implementing the functions/acts specified in the flowchart and/or block diagram block or blocks. These computer program instructions may also be stored in a computer-readable medium that can direct the head-mountable computing device 100 to function in a particular manner.

The computer program instructions may be loaded onto the processor 110 to cause a series of operational steps to be performed on the processor 110, to produce a computer-implemented process such that the instructions which execute on the processor 110 provide processes for implementing the functions/acts specified in the flowchart and/or block diagram block or blocks. The computer program product may form part of a computing device 100, e.g. may be installed on the head-mountable computing device 100.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of augmenting an illumination perception by a plurality of wearers of a plurality of head-mountable computing devices adapted to communicate with a lighting system, each of the plurality of head-mountable computing devices including at least one transparent display module for covering a field of view of each wearer of the plurality of wearers, the method comprising:
    determining a desired light condition for each of said plurality of wearers in a space;
    determining an actual light condition for each of said plurality of wearers in said space; and
    displaying a semi-transparent image on the at least one transparent display module of each of the plurality of head-mountable computing devices to filter a light passing through the at least one transparent display module in case the actual light condition differs from the desired light condition;
    communicating the desired light condition for each of the plurality of said wearers in said space and the actual light condition for each of the plurality of said wearers in said space to the lighting system including a plurality of light sources, for illuminating said space; and
    adjusting a light output of at least some of the light sources in response to said communication;
    wherein said adjusting comprises adjusting said light sources in response to a plurality of the desired light conditions and a plurality of the actual light conditions communicated to the lighting system by the plurality of head-mountable computing devices within said space.

2. The method of claim 1, wherein each of the head-mountable computing devices of said plurality of wearers in space comprises an image sensor, where the determining said actual light condition for each of said plurality of wearers in said space is performed with said image sensor.

3. The method of claim 1, wherein the determining said desired light condition for each of said plurality of wearers in said space comprises:
    determining, a task performed by each wearer by capturing a further image indicative of said task and recognizing said task from said further image; and
    retrieving the desired light condition for said task.

4. The method of claim 3, further comprising selecting the semi-transparent image based on the desired light condition, wherein the desired light condition is defined for said task.

5. The method of claim 1, further comprising calculating the semi-transparent image with the lighting system and communicating the semi-transparent image from the lighting system to each head-mountable computing device of the plurality of head-mountable computing devices.

6. The method of claim 1, further comprising:
    determining a respective position of each of the plurality of head-mountable computing devices within said space, wherein said adjusting comprises adjusting the light output of said light sources in response to said plurality of the desired light conditions, said plurality of the actual light conditions and the respective positions of each of the plurality of head-mountable computing devices within said space.

7. The method of claim 1, further comprising:
    calculating a minimum required light condition for said space based on said plurality of the desired light conditions, said minimum required light condition ensuring that the actual light condition in each respective position of each of said head-mountable computing devices enables the desired light condition for its respective head-mountable computing device; and
    adjusting the light output of at least some of said light sources in order to achieve the minimum required light condition for said space.

8. The method of claim 1, wherein the plurality of light sources are arranged in a network further comprising a system processor, wherein the system processor is adapted to:
    receive a communication, from at least one head-mountable computing device of the plurality of head-mountable computing devices, including the desired light condition and the actual light condition as determined by the at least one head-mountable computing device; and
    calculate respective settings for said light sources in order to adjust a light output of at least some of the light sources in response to a difference between the determined actual light condition and the determined desired light condition for the at least one head-mountable computing device communicated to the lighting system.

9. The method of claim 1, wherein a processor is adapted to execute a computer program code of a computer program product to perform at least the steps of:
    determining the desired light condition for each of said plurality of wearers in a space;
    determining the actual light condition for each of said plurality of wearers in said space;
    displaying the semi-transparent image on the at least one transparent display module of each of the plurality of head-mountable computing devices to filter the light passing through the at least one transparent display module in case the actual light condition differs from the desired light condition; and
    communicating the desired light condition and the actual light condition to the lighting system including the plurality of light sources for illuminating said space in order to adjust a lighting level produced by the lighting system and to provide each wearer of said plurality of wearers with the desired lighting condition;
    wherein the semi-transparent image comprises different filter properties in different regions of the image so as to block different amounts of the light passing through the at least one transparent display module.

* * * * *